Patented May 27, 1941

2,243,254

UNITED STATES PATENT OFFICE 2,243,254

HORTICULTURAL EMULSION SPRAY COMPOUND

Frank F. Lindstaedt, Oakland, Calif.

No Drawing. Application November 14, 1934,
Serial No. 752,990

6 Claims. (Cl. 167—28)

This case forms a continuation in part of my pending application Serial No. 715,179, now Patent No. 2,110,398, issued March 8, 1938, relating to compounds or mixtures which are used with petroleum oil or other spray oils to render the same emulsifiable in water as an insecticidal horticultural spray. More particularly this application relates to and is designed to a large extent to elaborate on the specie of the invention disclosed in said parent application, embodying the inclusion in the emulsifying compound of naphthenic acid and a sulphonic acid radical.

As is well known, petroleum oil of varying degrees of purity and viscosity has long been used and recognized as an insecticide for horticultural sprays. Since in most cases however, the oil when sprayed at full strength produces oil deposits on the plant life which are much too heavy and penetrating and generally deleterious to the plant life, the oil in the majority of instances of use must be diluted for safe use. Water is most commonly used as a diluting agent or carrier for the oil but, as is understood, the oil is not readily miscible with or dispersible in the water so that in combination with the oil and water an emulsifying agent of one form or another is widely employed. Originally the oil was prepared in a form generally known as commercial paste emulsion which consisted of a concentrated oil emulsion of petroleum oil, emulsifier, and water, and which was sufficiently stable so as not to break down during storage and transportation and which was in a form for ready dilution with further water in the spray tank of the spray apparatus preparatory to use. Usually these commercial emulsions contained from about fifty to eighty-five per cent hydrocarbon oil and the balance made up of emulsifier and water.

Later, and during the past few years, numerous attempts have been made to produce a spray oil which without first being placed in an emulsified form could be added directly to the spray tank for dilution with and dispersement in water. This class of spray oils is generally known as emulsible oils and such oils are usually composed of about ninety-five to ninety-nine per cent hydrocarbon oil and from one to five per cent of some emulsifying agent which in most cases is soluble in the hydrocarbon oil. Examples of the emulsifying substance heretofore used in the emulsible type of spray oil are tri-ethanolamine soaps, glycerol oleate, glycol oleate, di-glycol oleate and other similar materials all of which have been tried and used with varying degrees of success.

The emulsible oils possess many advantages over the commercial paste emulsions. For instance, there is no difficulty encountered with changes or decomposition of the oil upon standing or storage, they are not injured or impaired by freezing or other temperature changes, they are easier to manufacture than the paste emulsions, and they are more fluid than the concentrated emulsions and can therefore be measured more accurately. In addition, the self emulsifying oil is substantially one hundred per cent insecticidal whereas the commercial paste emulsions contained from three to fifty per cent water and emulsifier which is classed as inert.

While the emulsible type of oil possesses many advantages over the commercial paste emulsion, I have found that they do not give as high an oil deposit on the subject being sprayed per unit area when the oil is diluted to proper spray strength and sprayed as do the commercial paste emulsions diluted to a corresponding strength. Thus notwithstanding the higher percentage of oil present in the emulsible type of spray, tests have actually disclosed that there is a lower percentage of deposit of oil on the subject being sprayed than in the case of the commercial paste emulsion. I have further discovered that this relatively low deposit of oil in the case of the emulsible oils is caused by reason of the fact that the emulsifiers used formed emulsions that were too stable. That is, the minute particles of the spray emulsion would not break with sufficient quickness and in sufficiently large numbers, on impact with the object being sprayed, to liberate the oil for engagement in free form with the object being sprayed.

In keeping with the above explanation, I have disclosed in the application aforesaid, an emulsifier consisting of a combination of a sulphonated and a free organic acid for use with a petroleum spray oil and which produced a spray oil of the self emulsible type. This oil while readily providing an emulsification with water in the tank of the spray apparatus and being readily dispersible through the water for spraying, will break quickly on impact with the surface being sprayed and thereupon liberate in free form the oil contained therein. As one of the specific examples disclosed in said application, I set forth the combination of naphthenic acid and a sulphonic acid such as sulphonated oleic acid or sulphonated castor oil. This combination, as will be readily evident, affords when the ingredients are used in the proportions suggested, that is with equal parts of the sulphonated acid and the naphthenic acid, an amount of reaction product, and a certain excess of free naphthenic acid. Such reaction product is produced in the course of compounding the ingredients and affords with the free naphthenic acid a preparation which not only renders the hydrocarbon oil completely emulsifiable in the water vehicle, but one which is completely soluble and/or dispersible in the hydrocarbon oil. It will be understood however that in accordance with the manner of compounding recommended in my previous application, the product in order to be most effective, entails the heat treating of the ingredients. I have now found that where a sulphonated acid and naphthenic acid are combined to afford in proportion an amount of free naphthenic acid much greater than that obtaining in the mixtures first set forth, a composition will be provided which will afford the complete emulsification and solution and/or dispersion aforesaid without requiring any heat treatment in the preparation of the emulsifying agent. In other words, by arranging for inclusion in the compound, of more free naphthenic acid than is required for producing complete emulsion of the hydrocarbon oil in the carrier, there will be additionally accomplished without the requirement of heat treatment in the preparation of the emulsifying medium the complete solution and/or dispersion of the latter in such oil. In view of the foregoing, it is an object of the invention to provide an emulsifier having the advantageous characteristics described, which can be compounded without necessitating the heating, filtering or decanting of the ingredients, or other time consuming and cost involving operations.

Another object of the invention is to provide an emulsifying composition with the above mentioned advantages, in which the substance adapted primarily for effecting the emulsion of the spray oil and the ingredient arranged for providing for the solubility of the emulsifier compound in the spray solution may have the same acid radical.

The invention possesses other objects which with the foregoing will be set forth in the following description of the preferred forms of the invention. It is to be understood, however, that I do not limit myself to said description, as I may adopt variations, from said forms within the scope of the invention as set forth in the claims.

In my said application, I explained that by heat treating a sulphonic acid or a sulphonated oil with an ordinary fatty acid or its ester derivatives, an emulsifier may be obtained which is readily soluble in petroleum distillates of a wide range of densities and viscosities and provides for a most effective emulsible oil of the character described. As previously explained, in the present case, I select a specie disclosed in the said application, to wit the combination of a sulphonated acid and naphthenic acid and demonstrate that where the content of the naphthenic acid is increased over the proportion noted in said application that an emulsifier may be produced without heating and which is substantially completely soluble in the hydrocarbon oil. This increased proportion of naphthenic acid therefore in one sense forms the basis of the present application and as a specific example and particularly advantageous embodiment of the invention I combine with the naphthenic acid in the quantity aforesaid the sulphonated naphthenic acid utilized in the specie of the invention disclosed in the first application. I also prefer when using this combination to employ sulphonated and free naphthenic acid from the same genesis or source such as for instance from the kerosene petroleum fraction. However, under some circumstances it may be more practical to combine sulphonated naphthenic acid from one fraction with naphthenic acid from another fraction.

In compounding this embodiment of the invention I prefer to use one part sulphonated naphthenic acid to two parts or more of free naphthenic acid. The portion of the emulsifier in the hydrocarbon oil is preferably low consistent with the stability of the emulsion to be obtained and will in most instances vary from about ¼ to 2 parts of emulsifier to about 99¾ to 98½ parts hydrocarbon oil. This mixture provides, as above explained for the emulsible oil or oleaginous ingredient of the spray and is manufactured, sold and shipped to the place of use for introduction into the tank of the spray apparatus for dilution with water. The quantity of water which is added to this oleaginous material in the spray tank may vary under different conditions but is usually in the proportion of one to five parts of oleaginous material to about ninety-five parts water.

I have found that with the general combination as outlined above that the self-emulsifying oil will be readily dispersed through the water phase on introduction thereof into the spray tank and that an emulsion is produced which has sufficient stability to hold the oil uniformly suspended with but a minimum agitation and yet the emulsion will be sufficiently unstable so as to break appreciably immediately upon impact of particles thereof on the subject being sprayed to liberate thereon part of the oil content in the emulsion in a substantially free form.

It may be added that the use of the naphthenic acid is in itself highly beneficial as an insecticide, since it lends increased toxicity to the spray and serves to retard penetration of the hydrocarbon oil in the plant tissue.

I claim:

1. An emulsifier agent for use with a hydrocarbon spray oil and water to provide a quick breaking spray emulsion comprising, a sulphonated naphthenic acid and a preponderance of a free naphthenic acid.

2. An emulsible oil for use with water to provide a quick breaking spray emulsion comprising in combination, petroleum oil, a sulphonated naphthenic acid, and a preponderance of a free naphthenic acid.

3. A self-emulsifying oil for use with water to provide a quick breaking spray emulsion comprising, petroleum oil, a sulphonated naphthenic acid, and a free naphthenic acid, and consisting of proportions of substantially one part sulphonated naphthenic acid to about two parts free naphthenic acid and substantially one part of this mixture to about ninety-nine parts of petroleum oil.

4. A self-emulsifying oil for use with water to provide a quick breaking spray emulsion comprising, petroleum oil, a sulphonated naphthenic acid, and a free naphthenic acid, and in the proportion of substantially one part sulphonated naphthenic acid to about two parts free naphthenic acid and this mixture in a preponderance of petroleum oil.

5. A self-emulsifying horticultural spray oil adapted when mixed with water to provide a quick breaking spray emulsion and comprising in combination, a petroleum oil, a sulphonated naphthenic acid, and a naphthenic acid.

6. A self-emulsifying horticultural spray oil adapted when mixed with water to provide a quick breaking spray emulsion and comprising in combination, a petroleum oil, a sulphonated naphthenic acid, and a naphthenic acid, the sulphonated naphthenic acid and the naphthenic acid being added to the petroleum oil in a proportion not substantially exceeding two per cent.

FRANK F. LINDSTAEDT.